Figure 1:
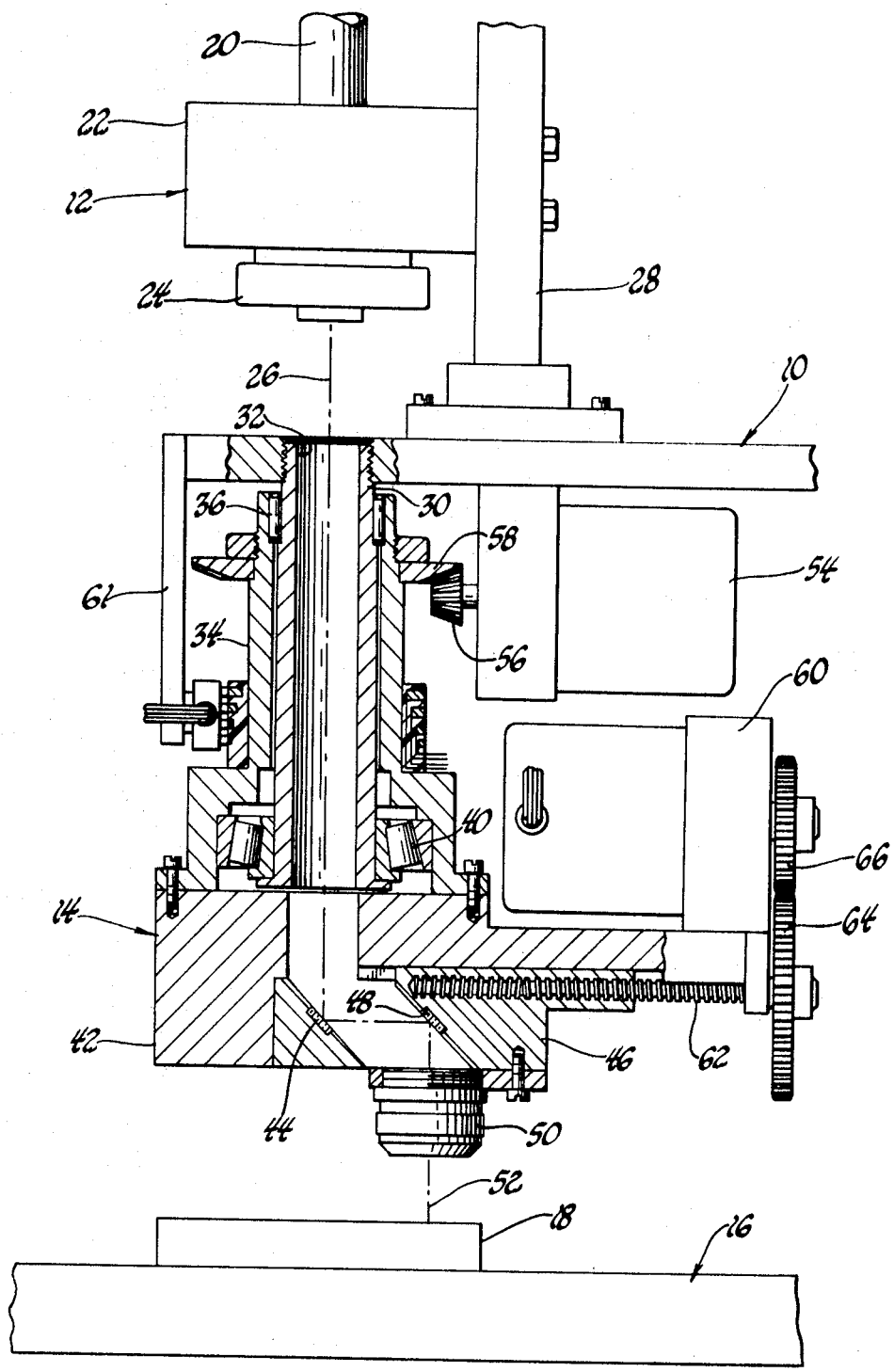

[11] 3,619,550

| | | | |
|---|---|---|---|
| [72] | Inventor | David R. Matthews Ann Arbor, Mich. | |
| [21] | Appl. No. | 860,986 | |
| [22] | Filed | Sept. 25, 1969 | |
| [45] | Patented | Nov. 9, 1971 | |
| [73] | Assignee | Laser Systems Corporation Ann Arbor, Mich. | |

[54] LASER BEAM MACHINE TOOL WITH BEAM MANIPULATING APPARATUS
7 Claims, 3 Drawing Figs.

[52] U.S. Cl. .................................................. 219/121 L
[51] Int. Cl. .................................................. B23k 9/00
[50] Field of Search .......................................... 219/121; 331/94.5; 350/6, 7, 52, 301; 209/111.7; 355/57, 67, 65, 69; 95/45; 356/172; 250/219

[56] References Cited
UNITED STATES PATENTS

| | | | |
|---|---|---|---|
| 2,172,098 | 9/1939 | Eppenstein .................. | 356/15 |
| 2,873,381 | 2/1959 | Lauroesch .................. | 350/7 |
| 3,154,370 | 10/1964 | Johnson ...................... | 346/108 |
| 3,181,170 | 4/1965 | Akin ........................... | 346/108 |
| 3,297,876 | 1/1967 | DeMaria ..................... | 250/199 |
| 3,348,547 | 10/1967 | Kavanagh.................... | 128/395 |
| 3,498,696 | 3/1970 | Kirby.......................... | 350/301 |

*Primary Examiner*—J. V. Truhe
*Assistant Examiner*—Lawrence A. Rouse
*Attorney*—Barnard, McGlynn & Reising ABSTRACT: A machine tool using a laser cutting beam is disclosed. The machine tool includes apparatus for directing the laser beam onto a workpiece at a desired location and for generating a predetermined pattern. A rotatable toolhead is provided with a beam passage along its axis of rotation and beam deflecting and beam forming means rotatable with the toolhead are operative to direct the beam onto the workpiece. The beam may be axially and radially offset as desired by reflectors movable with the toolhead so that the beam is manipulated in a highly efficient manner. The apparatus is capable of machining a workpiece surface with the cutting beam directed perpendicularly thereto at any desired radius ranging from zero upwards. It is also capable of machining a workpiece surface inclined at any angle with reference to the axis of toolhead rotation. The apparatus is especially adapted for use in automatically controlled machine tools for programmed movement of the cutting beam.

INVENTOR.
David R. Matthews

LASER BEAM MACHINE TOOL WITH BEAM MANIPULATING APPARATUS

This invention relates to machine tools and more particularly to a machine tool using a radiant energy cutting beam with apparatus for directing a beam onto a workpiece and generating a predetermined scan pattern thereon.

The use of a radiant energy beam such as a laser beam for material removal in machining operations such as drilling and cutting is now an established technique in industry. There are many applications in which a laser is adapted to produce a cutting beam in a machine tool operation in industrial processing. Heretofore, in the use of lasers for machining operations, the general practice has been to utilize a substantially fixed laser and laser beam and provide means for manipulating the workpiece to produce a desired beam impingement and pattern generation thereon. In certain applications it is desired to manipulate the cutting beam through a predetermined pattern. Depending upon the particular workpiece, the pattern movement may be executed in a continuous or intermittent manner with the cutting beam energized either continuously or intermittently.

It is an object of this invention to provide a machine tool in which a radiant energy cutting beam such as a laser beam is manipulated to perform a machining operation at a predetermined location and direction on a workpiece.

A further object of the invention is to provide apparatus for directing a laser beam onto a workpiece and generating a predetermined scanning pattern of the beam on the workpiece.

A further object of the invention is to provide a machine tool which is especially adapted for directing a laser beam onto a workpiece with minimum power loss in the transmission path between the laser and workpiece.

More particularly, it is an object of the invention to provide apparatus adapted for automatic control which is capable of directing a laser beam onto a workpiece and generating a predetermined scan pattern on the workpiece.

Additionally, it is an object of the invention to provide apparatus for directing a laser beam onto a workpiece in a predetermined scanning pattern with a fixed or continuously varying radius ranging from zero to any desired value.

An additional object of this invention is to provide a laser machine tool capable of machining in predetermined patterns by rotation of the laser beam with respect to the workpiece with the beam focused or otherwise shaped to impinge upon the workpiece in a plane extending parallel, normal or inclined relative to the axis of rotation.

A further object of the invention is to provide a laser machine tool with a focused or otherwise shaped cutting beam movable in three planes to impinge upon the surface of a workpiece normal thereto in any desired location.

In accordance with this invention there is provided a machine tool including apparatus for directing a radiant energy cutting beam such as a laser beam onto a workpiece. A toolhead, rotatably mounted on a support member, defines a cutting beam passage along the axis of rotation and beam deflecting means are mounted on the head for rotation therewith in the beam passage and are operative to redirect the beam transversely of the axis. Beam forming means, such as a lens or mask, is mounted on the head for rotation therewith and is optically coupled with the deflecting means. For directing the beam onto the workpiece to provide for machining a workpiece surface in a plane normal to said axis, additional beam deflecting means may be radially disposed to provide the optical coupling between the first deflecting means and the beam forming means. Where it is desired to provide capability for machining such a workpiece surface at a very small radius, the optical coupling includes beam deflecting means to produce an axial offset of the beam prior to the final deflecting means. For a machining operation on a workpiece surface inclined relative to the axis of rotation, angular adjustment is provided for the beam deflecting means in the optical path preceding the beam forming means. In addition, means may be provided for synchronous movement of the toolhead, the beam deflecting means, and if desired the energization of the laser beam.

Figure 2:
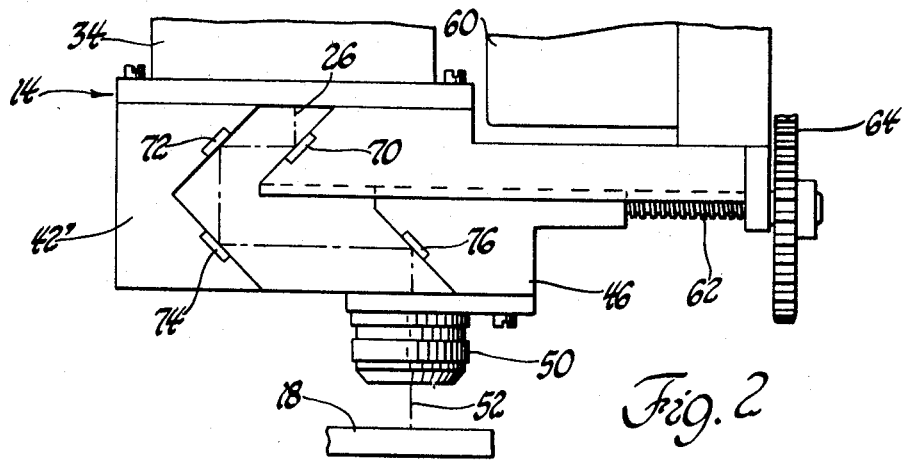
Figure 3:
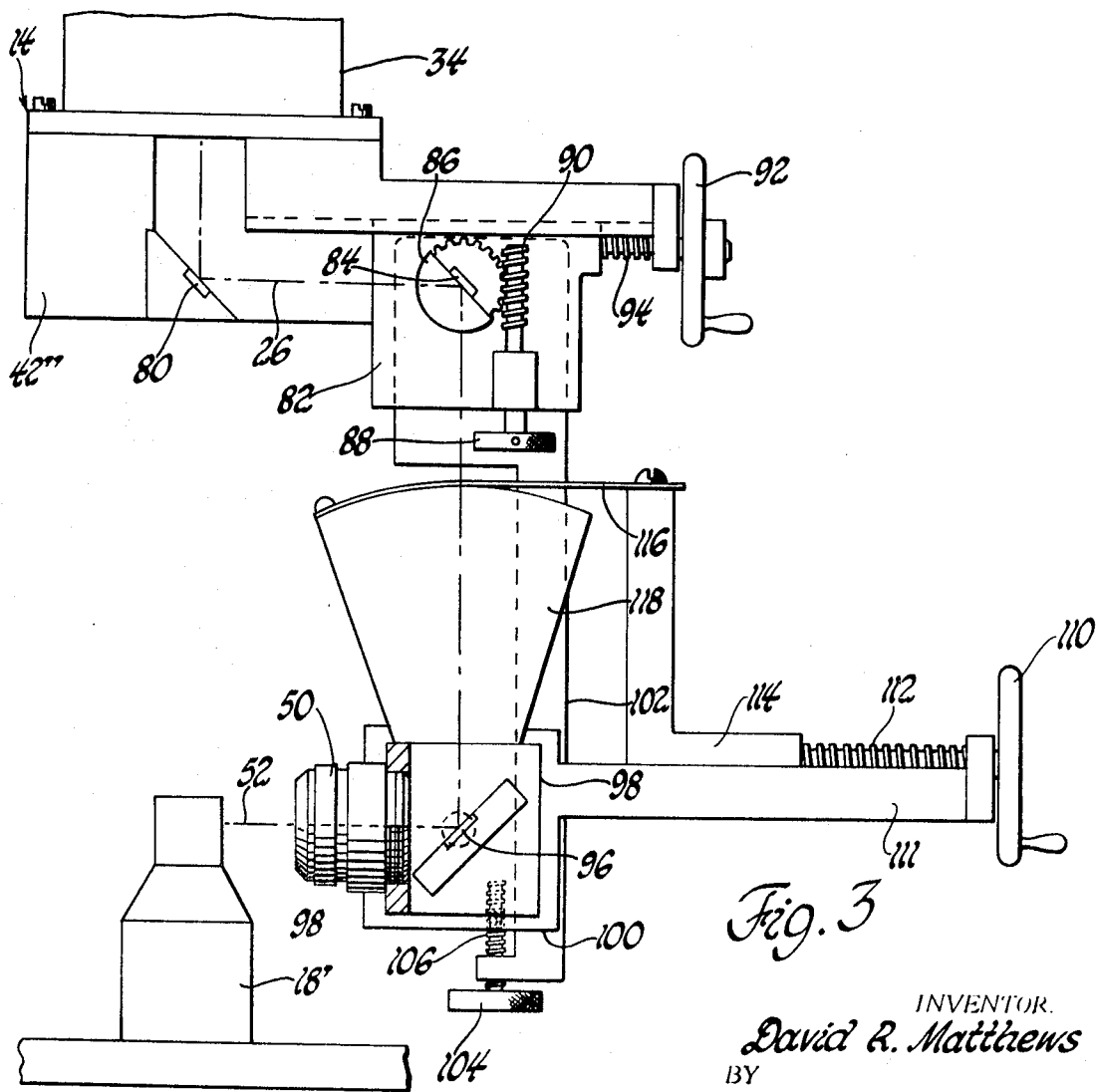

A more complete understanding of the invention may be obtained from the detailed description which follows taken with the accompanying drawings in which FIG. 1 shows a laser machine tool embodying the present invention;

FIG. 2 shows another embodiment of the invention with a modification to provide additional capability; and FIG. 3 shows another embodiment of the invention which affords additional degrees of freedom in beam manipulation.

Referring now to the drawings, there is shown an illustrative embodiment of the invention in a laser machine tool adapted for machining the surface of a workpiece with a laser beam in a predetermined location and pattern. As is well known, lasers have been developed which are capable of producing optical beams of sufficiently high power for machining a wide variety of materials including hard metals, rubber and plastics. The term machining, as used herein, includes not only material removal but also welding and fusion as well as softening or other heat treating of the material. At the present time there are several types of lasers which are suitable for machining applications including both solid state and gaseous lasers operated in either a continuous wave mode or a pulsed mode. Notable among such lasers is the recently developed carbon dioxide laser operated in a pulsed mode with a capability of exceedingly high energy per pulse, peak power and average power at a high pulse repetition rate. Such lasers are especially well adapted for machining operations which require or lend themselves to scanning motion of the high energy beam. In the description of the preferred embodiment of the invention that follows it will be apparent that the invention is especially adapted for use in a laser machine tool, i.e., one in which a laser is the source of the radiant energy beam. It will be appreciated however, that any other source of radiant energy having the requisite beam properties may also be used in practicing the invention. In the illustrative embodiment an optical beam from a laser is employed with a wavelength in the infrared portion of the electromagnetic frequency spectrum. The term optical beam is used herein to mean an electromagnetic radiant energy beam whether or not it has a wavelength corresponding to visible light or any particular portion of the electromagnetic spectrum.

As shown in FIG. 1, the machine tool comprises in general a support plate 10 upon which is mounted a laser 12 and a toolhead 14. A worktable 16 supports a workpiece 18 in a desired position with reference to the toolhead 14. The workpiece may be of any material which may be satisfactorily machined by a laser beam. In this embodiment it is assumed that it is desired to cut a predetermined pattern into the upper surface of the workpiece.

The laser 12 is a gas laser of the carbon dioxide type and the output head thereof only is shown in the drawings. The laser includes a plasma tube 20 which terminates in a support head 22 which is provided with an adjustable optical assembly 24 including an output coupling mirror which transmits the coherent optical output beam 26. The laser 12 is supported on a column 28 mounted on the support plate 10.

The toolhead 14 is supported for rotation on the support plate 10 by a depending column 30 which is fixedly secured to the support plate. The column 30 is provided with an axial bore or beam passage 32 adapted to transmit the optical beam 26. A carrier 34 is rotatably supported on the column 30 by an upper bearing 36 and a lower bearing 40. A support head 42 is fixedly secured to the carrier 34 for rotation therewith. The support head includes a beam deflector in the form of a reflector 44 such as a plane mirror disposed alignment with the beam passage 32 and in the path of the optical beam 26. The reflector 44 is operative to reflect beam transversely of the axis of rotation of the toolhead. The support head 42 also includes a cross-slide 46 provided with a reflector 48 disposed in the path of the optical beam 26 and adapted to reflect the beam in an axial direction. A beam forming means in the form of a lens 50 is secured to the cross-slide 46 for movement therewith and is adapted to focus the optical beam and produce a cutting beam 52 which impinges on the surface of the workpiece 18.

To provide for positioning of the cutting beam on the workpiece and pattern generation thereon if desired, the toolhead 14 is rotatably driven by a motor 54 mounted on the support plate 10. The drive train from the motor 54 includes a bevel gear 56 on the motor shaft and a bevel gear 58 mounted on the carrier 34. By means of the motor 54 the carrier 34 and hence the toolhead 14 may be positioned at any desired angular location about the axis of rotation. Consequently, the cutting beam 52 may be positioned at any circumferential or angular position about the rotational axis of the toolhead. To provide for radial adjustment of the cutting beam 52 a motor 60, suitably energized through brush and slip ring assembly 61, is mounted on the support head 42. A lead screw 62 is also mounted on the support head 42 and is operatively connected with the cross-slide 46. The lead screw is drivingly connected through gears 64 and 66 to the shaft of motor 60. Thus, the cross-slide 46 together with the reflector 48 and the lens 50 may be adjustably positioned in a radial direction on the toolhead 14. Consequently, the position at which the cutting beam 52 impinges on the workpiece is adjusted in a radial direction.

It will now be apparent that the machine tool just described may be operated in different modes depending upon the nature of the machining operation to be performed on the workpiece. The positioning motors 54 and 60 may be operated by manual control or, if desired, by automatic control with recorded programs as in conventional numerical control of machine tools. It will be apparent that for an operation like hole drilling the cutting beam 52 may be positioned on the workpiece at any desired location by adjustment of the cross-slide 46 to locate the beam at the desired radius and by adjustment of the angular position of the toolhead to locate the beam at the desired circumferential location. After proper position adjustment, the laser 12 is energized to perform the machining operation. It is deenergized when the operation is completed and the toolhead may be repositioned for a subsequent machining operation at a different location on the workpiece or if the final operation on the workpiece has been performed a new workpiece may be supplied to the worktable 16. On the other hand, if the nature of the machining operation is that of cutting a groove in the surface of the workpiece in a circular pattern the toolhead is adjusted for the proper radius and the laser 12 and the drive motor 54 are simultaneously energized at the desired feed and speed to generate a circular pattern of the cutting beam 52 on the workpiece 18.

In some operations it will be desired to direct the cutting beam onto the workpiece on the axis of rotation of the toolhead or at a radius of very small value. For this purpose, the embodiment of the invention shown in FIG. 2 may be utilized. This embodiment is the same as that shown in FIG. 1 except for a modified support head 42'. The support head 42' is provided with a reflector 70 disposed in alignment with the beam passage 32 in the path of the optical beam 26 and is effective to reflect the beam transversely of the axis of rotation. A beam deflector comprising reflectors 72 and 74 provides for axial offset of the optical beam with the reflector 72 disposed laterally of the reflector 70 and in the path of the beam and the reflector 74 disposed axially and adapted to reflect the beam transversely of the axis of rotation. A reflector 76 mounted on the cross-slide 46 is adapted to reflect the beam in an axial direction to the lens 50 to form the cutting beam 52 directed parallel to the axis of rotation of the toolhead.

It will be apparent that the embodiment of FIG. 2, as just described, permits adjustment of the radius of the cutting beam position from a value of zero upwards. This is accomplished by providing radial and axial offset to the beam path by means of reflectors 72 and 74 in the optical coupling between the reflector 70 and the lens 50. In this arrangement the cross-slide 46 may be positioned in a transverse direction so that the reflector 76 and, hence, the axial beam path is in alignment with the axis of rotation of the toolhead, i.e., at zero radius.

In some operations it will be desired to perform the machining on a workpiece surface which is inclined relative to the axis of rotation of the toolhead. The embodiment of the invention shown in FIG. 3 is adapted for such applications and includes a modified support head 42''. The support head 42'' provides additional degrees of freedom in adjustment of the cutting beam and for illustrative purposes it is shown with manual adjustments. The support head 42'' provides for optical coupling of the beam 26 to the workpiece and comprises a reflector 80 disposed in the beam passage 32 and which is adapted to reflect the optical beam transversely of the axis of rotation of the toolhead 14. On a cross-slide 82 which is supported on ways in the support head a reflector 84 in disposed laterally of reflector 80 and is adapted to reflect the optical beam in an axial direction. The reflector 84 is angularly adjustable by means of its mounting upon a rotatable support or shaft 86. The shaft 86 and, hence, the mirror 84 is adjustably positioned by means of a thumbwheel 88 which drives a worm gear 90 which, in turn, meshes with a gear sector on the shaft 86. The cross-slide 82 is adjustably positioned in a radial direction by means of a handwheel 92 and lead screw 94 connected therewith. The optical coupling of the beam 26 also includes a reflector 96 which is disposed axially from the reflector 84 and is adapted to reflect the optical beam in a direction transversely of the axis of rotation to the lens 50 which focuses the cutting beam 52 on a workpiece 18'. The reflector 96 and lens 50 are mounted upon a mounting plate 98 which in turn is rotatably mounted on a slide 100. The slide 100 is movable on ways formed on an adjustable support plate 102 which is fixedly mounted n the shaft 86 for movement therewith. By this arrangement angular adjustment of the reflector 84 by the thumbwheel 88 produces angular adjustment of the support plate 102 about the axis of shaft 86. The slide 100 mounted on the plate 102 is adjustable axially thereof by means of the thumbwheel 104 and lead screw 106.

In order to provide angular adjustment of reflector 96 and lens 50 in unison and independently of reflector 86, the mounting plate 98 is adjustable by means of the handwheel 110. The handwheel drives a lead screw 112 which threadedly engages a cross-slide 114 movable in ways on the slide 100. The cross-slide 114 is connected through a flexible band 116 to a sector plate 118 connected with mounting plate 98.

It will now be apparent that the embodiment of FIG. 3 is especially adapted for machining the surface of the workpiece inclined at any angle with respect to the axis of rotation of the toolhead. Adjustments for the desired radius at which the cutting beam 52 impinges upon the workpiece is accomplished by handwheel 92 which displaces the cross-slide 82 in a radial direction. Angular positioning of the reflector 84, reflector 96 and lens 50 in unison is accomplished by adjustment of thumbwheel 88 which, acting through the shaft 86, swings the adjustable support plate 102 about the axis of the latter. The desired axial position of the cutting beam 52 may be adjusted by the thumbwheel 104 and if necessary the angular position of the reflector 96 and the lens 50 in unison and independently of reflector 84 may be accomplished by adjustment of the handwheel 110 which acts through the sector plate 118 and the mounting plate 98. Thus, the cutting beam 52 may be positioned at any desired location with reference to the workpiece surface and oriented so as to impinge thereon substantially normal to the surface.

Although the description of this invention has been given with respect to particular embodiments, it is not to be construed in a limiting sense. Many modifications and variations will now occur to those skilled in the art. For a definition of the invention, reference is made to the appended claims.

The embodiments of the invention in which an exclusive property or privilege is claimed are defined as follows:

1. Apparatus for directing a beam of radiant energy onto a workpiece comprising: a support member adapted to receive a source of radiant energy, a toolhead rotatably mounted on the support member and defining a radiant beam passage along the axis of rotation, first beam deflecting means mounted on said head on said axis of rotation for rotation therewith about said axis in said beam passage and adapted to direct said axis, second beam deflecting means disposed in said beam path on said head for rotation therewith and being adapted to direct said beam along a beam path extending in the direction of said axis, beam forming means mounted on said head for rotation therewith and optically coupled with said second beam deflecting means for directing said beam onto the workpiece, and means for concurrently adjusting the radial position of said second beam deflecting means and said beam forming means.

2. The invention as defined in claim 1 wherein said beam forming means is optically coupled to the second beam deflecting means through a third beam deflecting means, the third beam deflecting means including a pair of reflectors mounted on said head for rotation therewith in an axially displaced position from the first beam deflecting means the first reflector being adapted to direct said beam in the direction of said axis and the second reflector being adapted to direct said beam transversely of said axis to the second beam deflecting means whereby the beam may be caused to impinge upon said workpiece at any desired radial and circumferential position.

3. The invention as defined in claim 1 wherein said second beam deflecting means and said beam forming means are mounted for concurrent angular adjustment in a plane through said axis and parallel thereto.

4. In a laser machine tool, apparatus for directing a laser beam onto a workpiece and generating a predetermined scan pattern thereon, said apparatus comprising: a fixed support member, a toolhead rotatably mounted on the support member and defining a laser beam passage along the axis of rotation, said support member being adapted to receive means for directing a laser beam into said passage, a first reflector mounted on said toolhead for rotation therewith in said beam passage obliquely of said axis and adapted to reflect said beam along a beam path extending transversely of said axis, beam forming means mounted on said toolhead for rotation therewith and optically coupled with said first reflector for directing said beam in the direction of said axis and onto a workpiece, means connected with said toolhead for imparting rotation thereto whereby said beam will produce a circular scan pattern, and means for adjusting the radial position of said beam forming means whereby the radius of said circular scan pattern may be adjusted.

5. The invention as defined in claim 4 wherein said beam forming means is optically coupled to said first reflector through a second reflector mounted on said toolhead for rotation therewith and connected with said beam forming means for concurrent radial adjustment therewith, the second reflector extending obliquely of said axis whereby the beam reflected therefrom extends in the direction of said axis toward said workpiece.

6. The invention as defined in claim 4 wherein the beam forming means is optically coupled to said first reflector through a second reflector mounted on said head for rotation therewith in said beam path and adapted to direct said beam in the direction of said axis, and a third reflector axially spaced from the second reflector and mounted on said head for rotation therewith for redirecting sd beam transversely of said axis, said second and third reflectors and said beam forming means being angularly adjustable about a transverse axis through the intersection of said beam path with said second reflector whereby the beam from said beam forming means may be inclined at a desired angle with reference to the axis of rotation of said toolhead.

7. The invention as defined in claim 4 wherein the beam forming means is optically coupled to the first reflector through a second reflector mounted on said toolhead for rotation therewith and disposed in a radially offset position from the first reflector in said beam path, the second reflector being adapted to redirect said beam path in an axial direction, a third reflector mounted on said toolhead for rotation therewith in an axially offset position from the second reflector in the beam path therefrom and adapted to redirect said beam path in a transverse direction, and a fourth reflector mounted on said toolhead for rotation therewith in a radially offset position from the third reflector and in an axially offset position from the first reflector and adapted to redirect said beam path in an axial direction, said fourth reflector being adjustable in a radial direction on said head whereby the formed beam may be caused to produce a circular scan of variable radius ranging from zero value to larger values.

* * * * *

UNITED STATES PATENT OFFICE
CERTIFICATE OF CORRECTION

Patent No. 3,619,550    Dated November 9, 1971

Inventor(s) David R. Matthews

It is certified that error appears in the above-identified patent and that said Letters Patent are hereby corrected as shown below:

Column 2, line 69 after "disposed" insert --in--. Column 4, line 33 "n" should be --on--. Column 5, line 4 after "said" (third occurence) insert --beam along a beam path extending transversely of said--. Column 6, line 19 "sd" should be --said--.

Signed and sealed this 16th day of May 1972.

(SEAL)
Attest:

EDWARD M. FLETCHER, JR.         ROBERT GOTTSCHALK
Attesting Officer               Commissioner of Patents